(12) United States Patent
Bianchi et al.

(10) Patent No.: US 10,796,513 B2
(45) Date of Patent: Oct. 6, 2020

(54) METHODS AND APPARATUS TO ADJUST AN ADVERTISING RATE OF A DEVICE TO REDUCE BATTERY USAGE (71) Applicant: Ford Motor Company, Dearborn, MI (US)

(72) Inventors: Arthur Thomas Bianchi, Sterling Heights, MI (US); Kevin F. Militello, South Lyon, MI (US); John Van Wiemeersch, Novi, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/472,623

(22) PCT Filed: Dec. 28, 2016

(86) PCT No.: PCT/US2016/068908
§ 371 (c)(1),
(2) Date: Jun. 21, 2019

(87) PCT Pub. No.: WO2018/125086
PCT Pub. Date: Jul. 5, 2018

(65) Prior Publication Data
US 2019/0385393 A1 Dec. 19, 2019

(51) Int. Cl.
G07C 9/00 (2020.01)
H04W 4/40 (2018.01)
B60R 25/33 (2013.01)
H04B 7/26 (2006.01)
H04W 52/02 (2009.01)

(52) U.S. Cl.
CPC .......... *G07C 9/00309* (2013.01); *B60R 25/33* (2013.01); *H04B 7/26* (2013.01); *H04W 4/40* (2018.02); *H04W 52/0245* (2013.01); *G07C 2009/00634* (2013.01); *G07C 2009/00769* (2013.01); *G07C 2209/63* (2013.01)

(58) Field of Classification Search
CPC ...... G07C 9/00309; G07C 2009/00634; G07C 2009/00769; G07C 2209/63; H04W 4/40; H04W 52/0245; H04B 7/26; B60R 25/33
USPC ........................................ 340/5.61
See application file for complete search history.

(56) References Cited

U.S. PATENT DOCUMENTS

| 9,008,917 | B2 | 4/2015 | Gautama et al. |
| 2006/0099940 | A1* | 5/2006 | Pfleging ................. H04M 3/42 455/419 |
| 2007/0200670 | A1 | 8/2007 | McBride et al. |
| 2008/0224895 | A1 | 9/2008 | Krishna et al. |

(Continued)

OTHER PUBLICATIONS

International Searching Authority, "International Search Report," dated Mar. 29, 2017 in connection with International Patent Application No. PCT/US2016/68908, 2 pages.

(Continued)

*Primary Examiner* — Ojiako K Nwugo
(74) *Attorney, Agent, or Firm* — Brandon Hicks; Hanley, Flight & Zimmerman, LLC (57) ABSTRACT Methods and apparatus to adjust an advertising rate of a device to reduce battery usage are described herein. An example method includes determining a distance of a device from a vehicle based on a signal, determining a state of motion of the device, and adjusting an advertising rate of the signal based on the distance and state of motion.

19 Claims, 7 Drawing Sheets (56) References Cited

U.S. PATENT DOCUMENTS

| | | | |
|---|---|---|---|
| 2009/0224879 A1 | 9/2009 | Nakazawa et al. | |
| 2011/0177790 A1 | 7/2011 | Monte et al. | |
| 2013/0176107 A1* | 7/2013 | Dumas | E05B 47/00 340/5.61 |
| 2014/0253288 A1* | 9/2014 | O'Brien | G07C 9/00309 340/5.61 |
| 2014/0292481 A1* | 10/2014 | Dumas | G07C 9/00174 340/5.61 |
| 2014/0357192 A1 | 12/2014 | Azogui et al. | |
| 2015/0116079 A1* | 4/2015 | Mishra | G07C 9/257 340/5.52 |
| 2015/0163748 A1 | 6/2015 | Hrabak | |
| 2015/0235486 A1 | 8/2015 | Ellis et al. | |
| 2016/0248905 A1 | 8/2016 | Miller et al. | |

OTHER PUBLICATIONS

International Searching Authority, "Written Opinion," dated Mar. 29, 2017 in connection with International Patent Application No. PCT/US2016/68908, 5 pages.

International Searching Authority, "International Preliminary Report on Patentability," dated Jul. 2, 2019 in connection with International Patent Application No. PCT/US2016/68908, 6 pages.

China National Intellectual Property Administration, "Notification of First Office Action," dated Aug. 4, 2020 in connection with Chinese Patent Application No. 2016800918472, 11 pages (including English Translation).

* cited by examiner

METHODS AND APPARATUS TO ADJUST AN ADVERTISING RATE OF A DEVICE TO REDUCE BATTERY USAGE

FIELD OF THE DISCLOSURE

This disclosure relates generally to reducing battery usage and, more particularly, to methods and apparatus to adjust an advertising rate of a device to reduce battery usage.

BACKGROUND

Smartphones and other Bluetooth® enabled devices are used to communicate with vehicles. A smartphone can constantly transmit a Bluetooth® signal to communicate with a vehicle or other devices or a vehicle can constantly transmit a Bluetooth® signal while the phone listens for and/or receives signals. In either case, the constant transmission and reception of the Bluetooth® signal can reduce the battery life of the smartphone and the vehicle.

SUMMARY

An example method includes determining a distance of a device from a vehicle based on a signal, determining a state of motion of the device, and adjusting an advertising rate of the signal based on the distance and state of motion.

An example apparatus includes a communication interface to transmit signals to or from a vehicle, an accelerometer to determine a state of motion, and a processor to adjust an advertisement rate of the signal based on a distance to the vehicle and the state of motion.

Another example apparatus includes a vehicle and a device to communicate with the vehicle, the device to adjust a rate of communication based on a distance of the device relative to the vehicle and a state of motion of the device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The apparatus and methods described herein may be used to extend the battery life of portable (e.g., hand-held devices, wearable devices, etc.) that communicate wirelessly with a vehicle or the battery life of the vehicle. As described in greater detail below, such devices (e.g., a key fob, smartphone, etc.) may be carried by a person (e.g., a driver) associated with the vehicle and used to automatically invoke one or more operations of a vehicle by detecting a location of the device and, thus, the person carrying the device, relative to the vehicle. For example, using the examples described herein, as a person carrying the device approaches an opening of the vehicle such as car door, trunk lid, lift gate, engine compartment hood, gas door, etc., that opening to which the person is sufficiently proximate may be automatically unlocked and/or opened to facilitate use of the vehicle by the person. Alternatively or additionally, other operations of the vehicle such as starting the engine, turning on exterior or interior lights of the vehicle may be invoked when the person is sufficiently proximate the vehicle.

Decreasing the intervals between or increasing the rate at which communications between the portable device and the vehicle occur enables a more timely automatic invocation of the vehicle operation(s) such as those noted above. A more timely invocation of these operations increases convenience for the person using the vehicle. However, more frequent communications between the portable device and the vehicle tends to consume an increased amount of energy and, thus, tends to decrease battery life.

To extend the battery life of the example portable apparatus or devices described herein, the example devices are operative to change a rate of transmission or reception of signals (i.e., a broadcast or advertising rate) from the portable device to the vehicle, or vice-versa, based on the distance between the device and the vehicle. Enabling the portable device, or vehicle, to change the advertising rate reduces power consumed by a communication interface (e.g., Bluetooth® Low Energy) and, thus, reduces the usage of energy from a battery of the device. The advertising rate changes based on the distance and a state of motion of the device (e.g., moving, stationary). More specifically, the advertising rate may be increased as the device nears the vehicle to improve the timeliness with which the operations to be invoked by the device are performed. In this manner, energy consumption from the battery is only increased as the device nears the vehicle when more frequent communications are needed to improve automatic invocation of the vehicle operation(s). Additionally, the advertising rate may be reduced or zero based on the state of motion of the device. For example, if the device is determined to be within the vehicle and the device is moving at a relatively high speed (the vehicle is being driven on a road), the advertising rate may be adjusted to zero because there is no possibility that the person driving the vehicle will require automatic invocation of any of the aforementioned vehicle operations in a relatively short period of time. Additionally, if the portable device is in any car, bus, train, plane or other fast moving vehicle where it is clear the user is not walking toward the target vehicle, the portable device may cease transmission or reception despite being in motion.

In the examples described herein, the vehicle periodically transmits signals to detect portable devices that may be in range of the signals. If a portable device is not within range of the signals from the vehicle, the device does not receive or detect the signals and does not advertise. Upon receiving and detecting a signal from the vehicle, the device begins transmitting a responsive signal. The vehicle and/or the device determine a distance between the device and the vehicle based on an analysis of a strength of the signal(s). If the device is in a first range (e.g., a far range), the device advertises at a first rate (e.g., a low rate) to enable the vehicle to detect any change in distance between the device and the vehicle. For example, a person carrying the device may be walking toward the vehicle. The vehicle can detect the change in the distance between vehicle and the device as the person walks toward the vehicle and the advertising rate of the device is adjusted accordingly (e.g., increased as the distance decreases). If the device is in the far range and is not moving, the device stops advertising. If the device is in a second range (e.g., an intermediate range), the device advertises at a second rate (e.g., an intermediate rate). If the device is in a third range (e.g., a near range), the device advertises at a third rate (e.g., a high rate) to detect a location of the device relative to the vehicle (e.g., a proximity of the device near a door or a lift gate). The vehicle may determine that the device is adjacent to the driver door and unlock the driver door to enable the user to easily open the driver door and enter the vehicle. Alternatively, the vehicle may detect that the device is in proximity to a passenger door or the lift gate and unlock the passenger door or open the lift gate.

The vehicle may determine that the device is in the vehicle based on the distance (e.g., a distance between a Bluetooth® receiver of the vehicle and the device is very short). If the device is not in motion, the advertising rate is adjusted to a first rate. If the device is in motion at a high speed (e.g., above a threshold speed), the device stops advertising to conserve battery life. The device may include a communication interface to transmit signals to the vehicle and/or receive signals from the vehicle, an accelerometer to determine whether the device is in motion, and a processor to adjust an advertisement rate of the signal based on the distance to the vehicle and the state of motion of the device.

Figure 1:
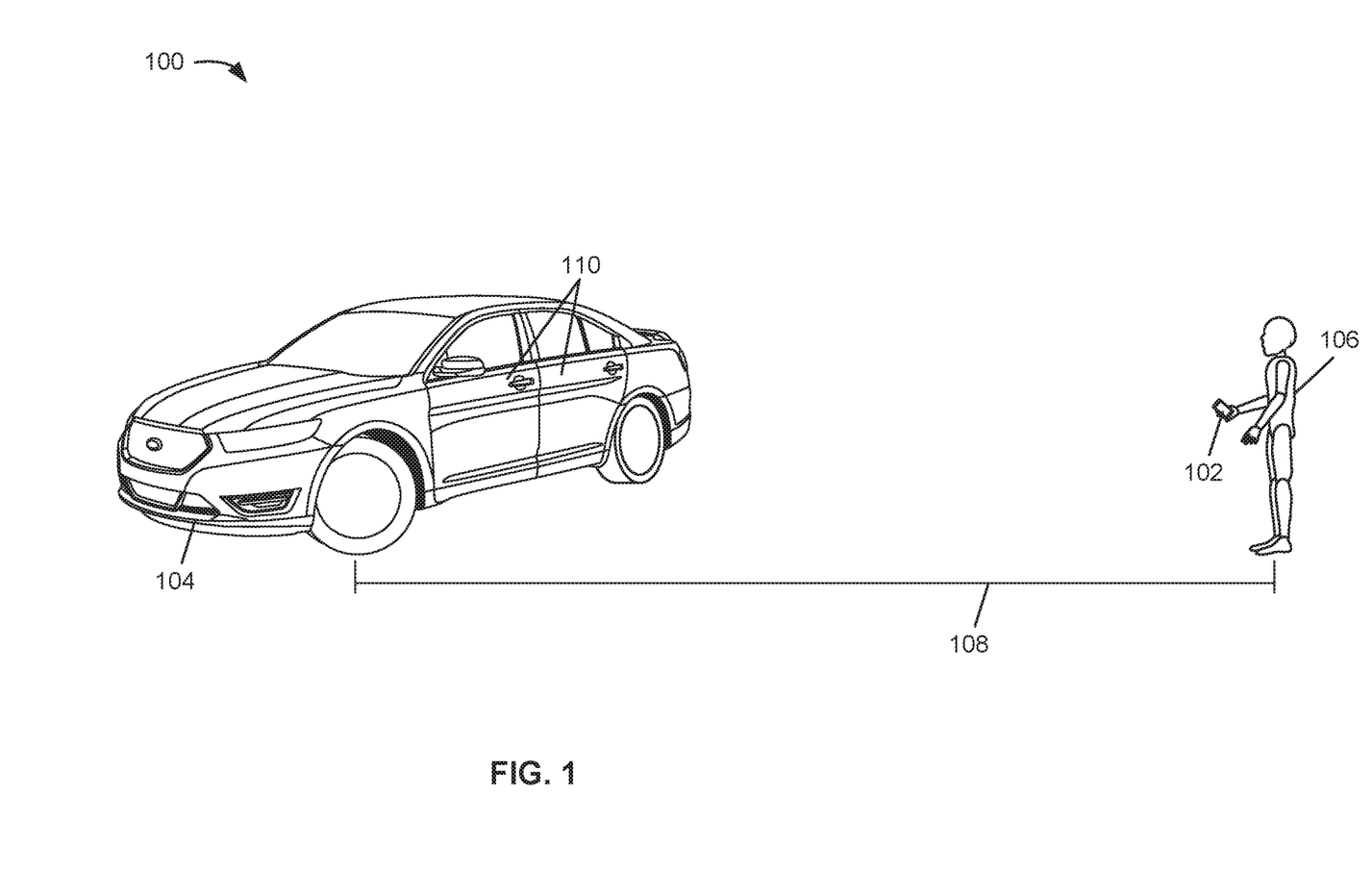
FIGS. 1-4 represents an example environment within which the example apparatus and methods described herein may be implemented.

FIGS. 1-4 represent an example environment 100 within which an example apparatus 102 may be implemented. The example apparatus 102 may include a smartphone, a key fob, or any other portable device operative to transmit wireless signals (e.g., Bluetooth® Low Energy signals, WiFi, ultra high frequency (UHF) signals, etc.) that may be used to automatically invoke an operation of a vehicle 104. In some examples, the signals may be operative to cause the vehicle 104 to unlock a door, trunk lid, lift gate or hood, turn on lights and/or start an engine based on the distance between the device 102 and the vehicle 104. In FIG. 1, the example environment 100 depicts a person or user 106 (e.g., a driver) with a device 102, such as a smartphone. The person 106 is standing away from the vehicle 104 at a first distance 108 that is within a first range (e.g., a far range). The vehicle 104 transmits signals periodically (i.e., at a rate or at spaced intervals) to detect any trusted device(s) 102 that may be within range of the vehicle 104. For example, trusted devices 102 have been paired with the vehicle 104 using a Bluetooth® interface (e.g., a communication interface 502, 504 of FIG. 5) and are capable of receiving signals from the vehicle 104. If the device 102 does not detect signals from the vehicle 104, the device 102 is not within range of the vehicle 104 and is in a resting state until a signal is received and detected. Upon detecting a signal, the device 102 may wake out of the resting state and transmit a responsive signal to the vehicle 104. Based on the signal strength, the vehicle 104 and/or the device 102 can determine a distance between the vehicle 104 and the person 106 bearing the device 102. The device 102 may begin advertising a signal (i.e., periodically broadcasting a signal) to the vehicle 104 at an advertising rate (e.g., periodically or a determined number of times per second) based on the distance between the device 102 and the vehicle 104.

In the illustrated example of FIG. 1, the vehicle 104 and the device 102 determine that the device 102 and, thus, the person 106, are located in the first range 108, which may be the furthest range within which the device 102 and the vehicle 104 can exchange a signal. When the device 102 is within the first range 108, the rate of advertising may also be based on whether or not the device 102 is in motion (i.e., a state of motion of the device 102). For example, if the device 102 is not in motion, the device 102 may stop advertising. In such examples, when the device 102 is in the first range 108 (e.g., the far range) and not in motion, the device 102 may determine that the person 106 is not moving toward the vehicle 104. Additionally, when the device is in the first range 108, the vehicle 104 may determine that operation of the vehicle 104 should not be invoked (e.g., that one or more doors 110 do not need to be unlocked). If the device 102 is in motion, the device 102 may continue to advertise at a first rate while the device 102 is in the first range 108 because the person 102 may soon be proximate the vehicle 104 and one or more operations of the vehicle 104 may be automatically invoked in the near future.

Figure 2:
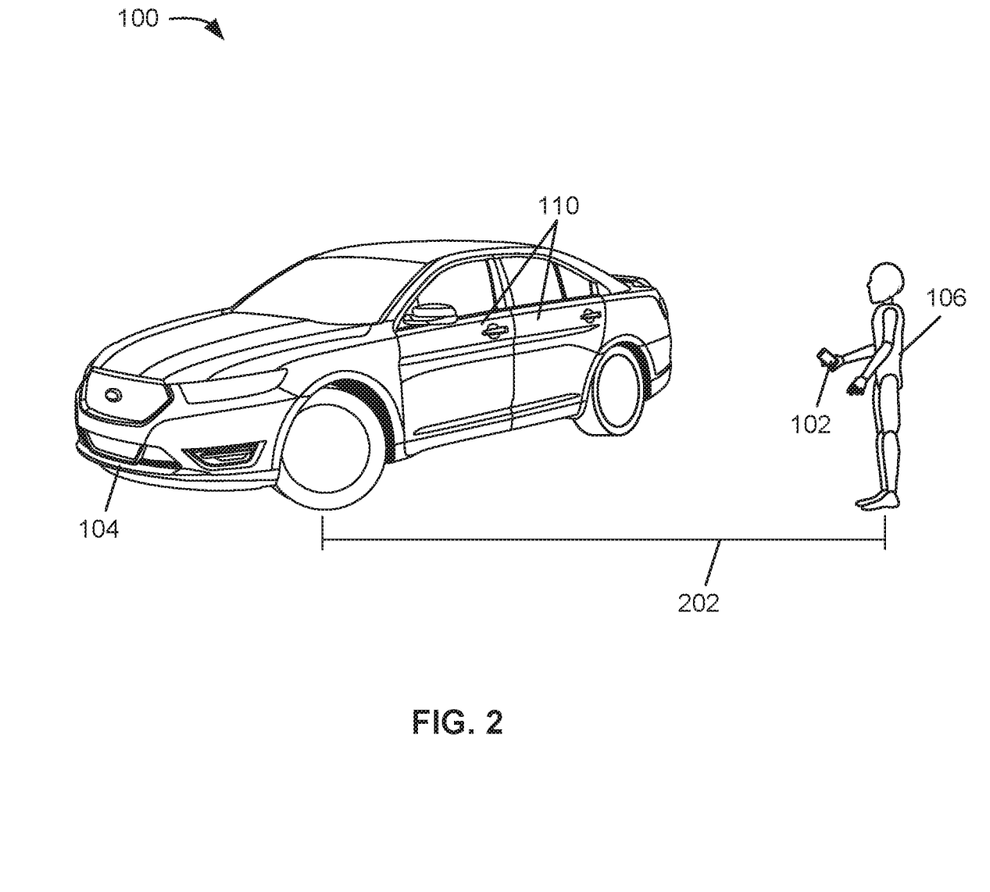

In FIG. 2, the person 106 with the device 102 in the example environment 100 is at a second distance 202 that is within a second range (e.g., an intermediate range). In the illustrated example of FIG. 2, the person 106 may have moved from the first range 108 to the second range 202, or the device 102 carried by the person 106 was first detected in the second range 202. Upon detection of the device 102 being in the second range 202, the device 102 advertises at a second rate (e.g., an intermediate rate). The second rate is faster than the first rate at which the device 102 advertises while in the far range 108.

Figure 3:
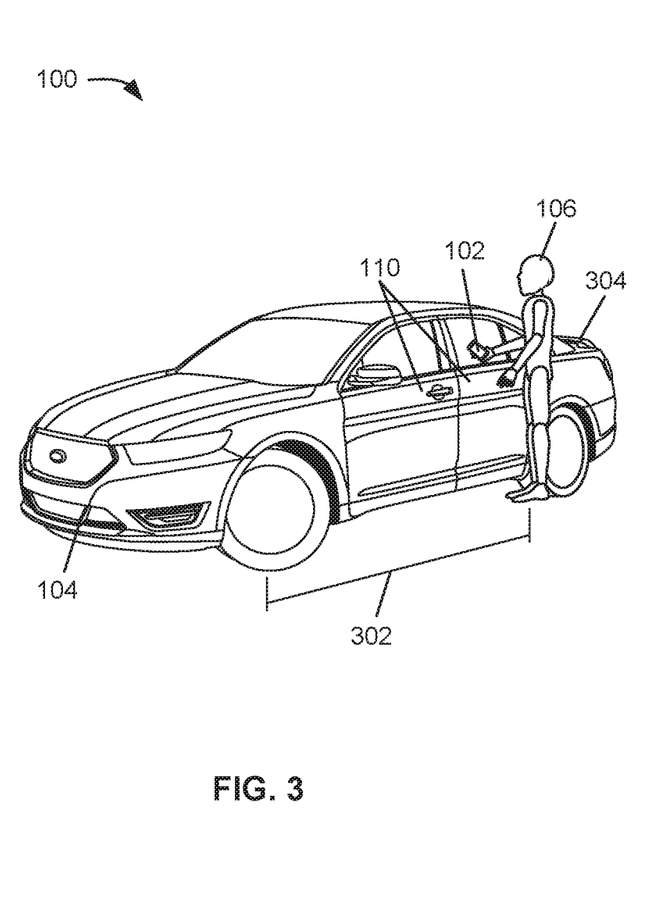

FIG. 3 depicts a person 106 with the device 102 at a third distance 302 that is in a third range (e.g., a near range) of the vehicle 104. Upon detecting that the device 102 has entered the third range 302, the device 102 advertises at a third rate (e.g., a high rate). The third rate is faster than the first and second rates. When in the third range 302, the vehicle 104 may automatically invoke one or more operations to facilitate use of the vehicle 104 by the person 106. For example, the vehicle may unlock one or more doors 110 or a trunk lid 304 of the vehicle 104 based on a location of the device 102. The location of the device 102 may be determined using multiple Bluetooth® Low Energy antennas disposed on the vehicle 104 and operative to receive a signal from the device 102. The analysis of the signals received by the antennas can determine the location of the device 102 relative to the doors 110 and the trunk lid 304 of the vehicle 104. Location may also be determined by other methods such as Angle-of-Arrival or Signal Phase. The increased rate of advertising improves the speed at which the location of the device 102 can be determined and enables one or more operations of the vehicle 104 to be invoked and performed in a more timely manner for the person 106 (e.g., one or more of the doors 110 and/or the trunk lid 304 of the vehicle 104 may be unlocked as soon as the person 106 is proximate the door(s) 110 or the trunk lid 304).

Based on the determination of the portion of the vehicle 104 to which the person 106 is most near, the vehicle 104 may, for example, unlock only one of the doors 110 (e.g., the door to which the person 106 is closest). If the person 106 is closest to the trunk lid 304, the vehicle 104 may automatically unlock or open the trunk lid 304. Unlocking only one door 110 or the trunk lid 304 enables the person 106 to enter the vehicle 104 or access a cargo area without concern of another person entering or otherwise accessing the vehicle 104. In some examples, the person 106 may be able to provide preferences related to what vehicle operations are to be performed (e.g., which and how many doors are to be opened) when the device 102 is within the third range 302. For example, a person 106 that often travels with multiple people may instruct or configure the vehicle 104 to unlock all doors 110 when the device 102 is in the third range 302 rather than only the door 110 to which the device 102 is closest. In some examples, when the vehicle 104 detects the device 102 has moved out of the third range 302 into the second range 202 or the first range 108, the vehicle 104 may automatically lock all of the doors 110.

Figure 4:
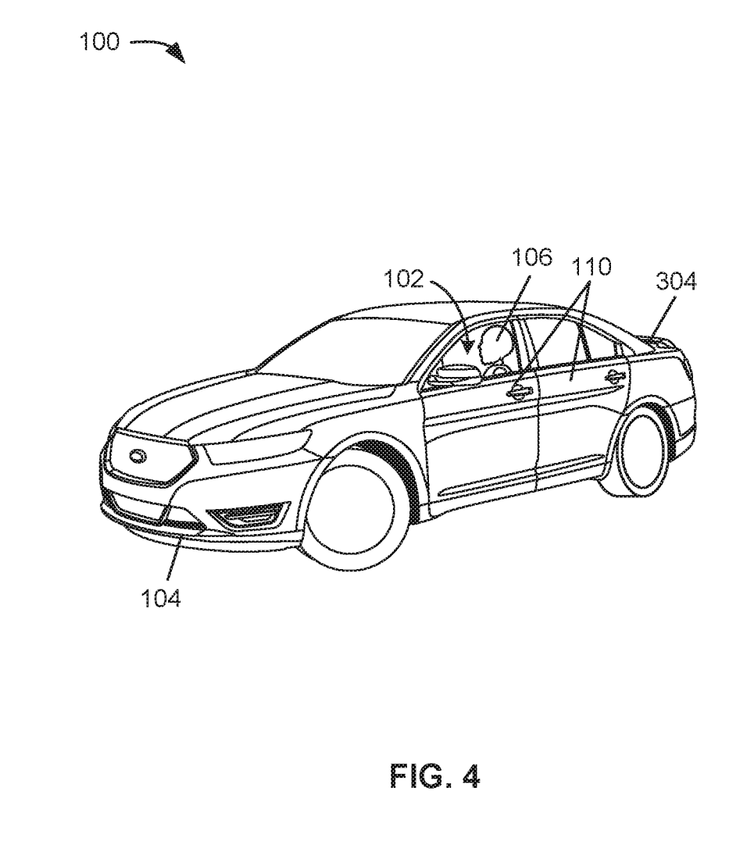

FIG. 4 depicts the person 106 in the vehicle 104. In this illustrated example, when the device 102 is detected in the vehicle 104, the advertising rate of the device 102 may be based on the speed or motion of the vehicle 104 and/or whether an engine and/or other system of the vehicle 104 is operating. For example, if the vehicle 104 is stopped and the device 102 is inside the vehicle 104, the device 102 continues to advertise at a low rate to enable timely detection of the location of the device 102 if the device 102 moves outside of the vehicle 104. If the vehicle 104 begins moving at a low speed (e.g., less than 10 miles per hour), the device 102 continues to advertise at a low rate. If the vehicle 104 speed increases, the device 102 stops advertising. When the vehicle 104 is moving at a high speed (e.g., greater than 10 miles per hour), the person 106 is unlikely to move out of range of the vehicle 104 in a short period of time and, thus, it is unnecessary to closely (i.e., frequently) determine the location of the device 102. Upon stopping the vehicle 104, the device 102 may resume advertising at a low rate. The device 102 advertises at a low rate when the vehicle 104 is stopped and turned off. The vehicle 104 detects when the device 102 moves outside of the vehicle 104 and the advertising rate of the device 102 is adjusted accordingly. Additionally, when the device 102 is moving at a high speed and is not in range of the vehicle 104 (e.g., the person 106 and the device 102 are traveling at a high speed using public transportation, a second vehicle, etc.), the device 102 is not advertising or receiving signals.

Figure 5:
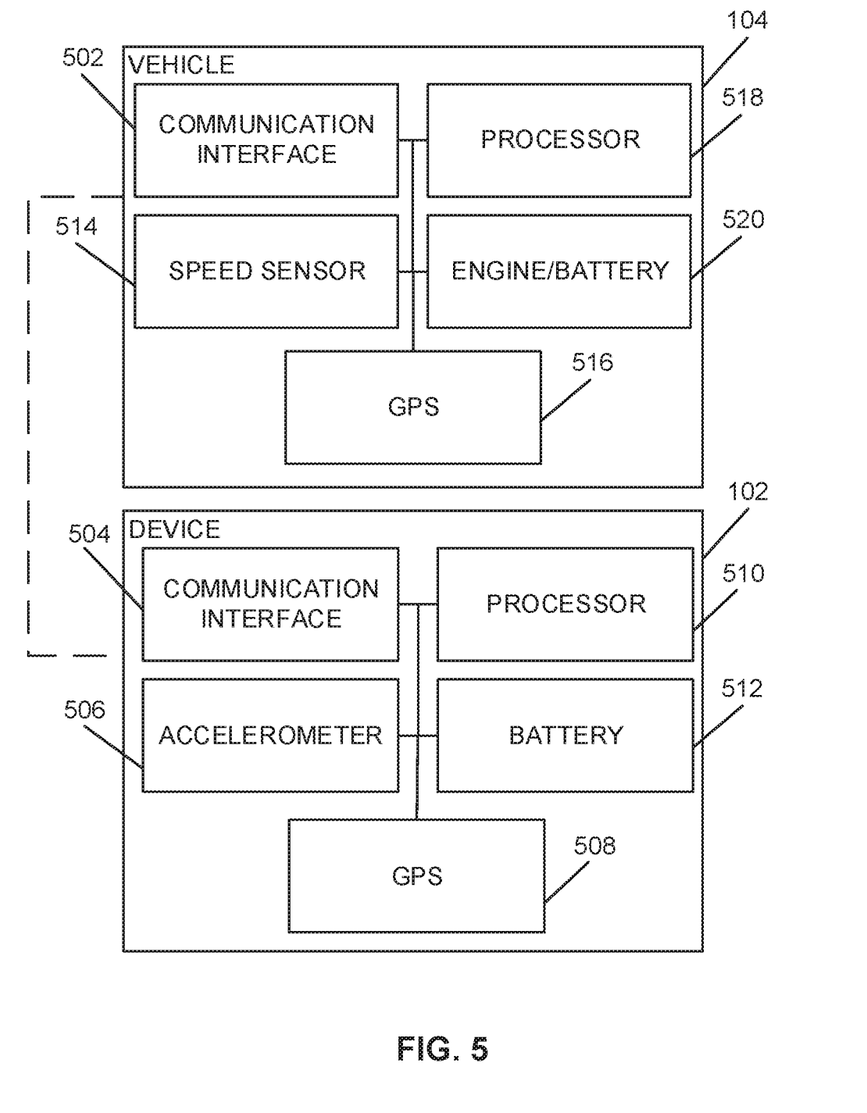
FIG. 5 depicts a block diagram representing an example apparatus that may be used within the example environment of FIGS. 1-4.

FIG. 5 depicts a block diagram representing an example implementation of the device 102 and the vehicle 104 that may be used within the example environment 100. As shown in FIG. 5, the example vehicle 104 may be communicatively coupled to the example device 102. In some examples, the device 102 and the vehicle 104 communicate using Bluetooth® Low Energy communication methods. For example, a communication interface 502 of the vehicle 104 transmits Bluetooth® Low Energy signals and a communication interface 504 of the device 102 may receive the Bluetooth® Low Energy signals. The example communication interface 502 of the vehicle 104 includes multiple antennas placed at various locations on the vehicle 104 to enable the vehicle 104 to determine a location of the device 102 based on an analysis of the strength of the signal received by each antenna or other methods such as Angle-of-Arrival or Signal Phase. In the illustrated example, both communication interfaces 502, 504 are operative to transmit and receive Bluetooth® signals. Alternatively, other means of communication that enable the device 102 and vehicle 104 to communicate to may be used.

In the illustrated example in FIG. 5, the device 102 may additionally include an accelerometer 506 to monitor and detect movement (e.g. a speed or other state of motion) of the device 102. Additionally or alternatively, a GPS receiver 508 and/or Cellular transceiver to detect location and/or motion of the device 102 by reference of GPS satellites or terrestrial cell towers. In some examples, the GPS receiver 508 may be used to determine the speed of the device 102 when the device is not within range of the vehicle 104. If the device 102 is located within the vehicle 104, the speed of the device can be matched to the speed of the vehicle 104 using data communicated using Bluetooth® signals via the communication interfaces 502, 504. The detected movement may be used by a processor 510 to determine whether the device 102 is stationary or in motion (e.g., being carried by the person 106 as the person 106 is moving toward or away from the vehicle 104). The processor 510 is also operative to determine the distance between the device 102 and the vehicle 104 by analyzing the strength of signals sent by the device 102 and received by the vehicle 104. The processor 510 may additionally be operative to control an advertising rate of signals from the communication interface 504 of the device 102 based on the distance and/or the detected movement or state of motion of the device 102. Controlling (e.g., reducing) the advertising rate of the device 102 enables the communication interface 508 to use less energy from a battery 512 when the device 102 is not within the third range 302 of the vehicle 104, thereby increasing the life of the battery 512.

In addition to the communication interface 502, the example vehicle 104 may include a speed sensor 514 to detect a speed of the vehicle 104 and/or whether the vehicle 104 is in motion. Additionally or alternatively, a GPS receiver 516 may be operative to determine the speed and location of the vehicle 106. In some examples, the accelerometer 506 of the device 102 is operative to determine a motion of the device 102 and, thus, the vehicle 104. The device 102 may be operative to adjust an advertising rate of the device 102 based on whether the vehicle 104 is in motion and/or the speed at which the vehicle 104 is traveling. A processor 518 of the vehicle 104 is operative to analyze the signals from the device 102 to determine a distance between the device 102 and the vehicle 104. The processor 518 may also be operative to determine the status of an engine and/or battery 520 of the vehicle 104. The status of the engine or battery 520 of the vehicle 104 may also be a factor in determining an advertising rate of the device 102. Information determined by the processor 518 may be communicated to the device 102 via the communication interfaces 502, 504 of the vehicle 104 and the device 102. The processor 510 of the device 102 then adjusts the advertising rate of the device 102 based on the distance, speed, and a status of the engine or battery 520 of the vehicle 104 and the state of motion of the device 102.

Figure 6A:
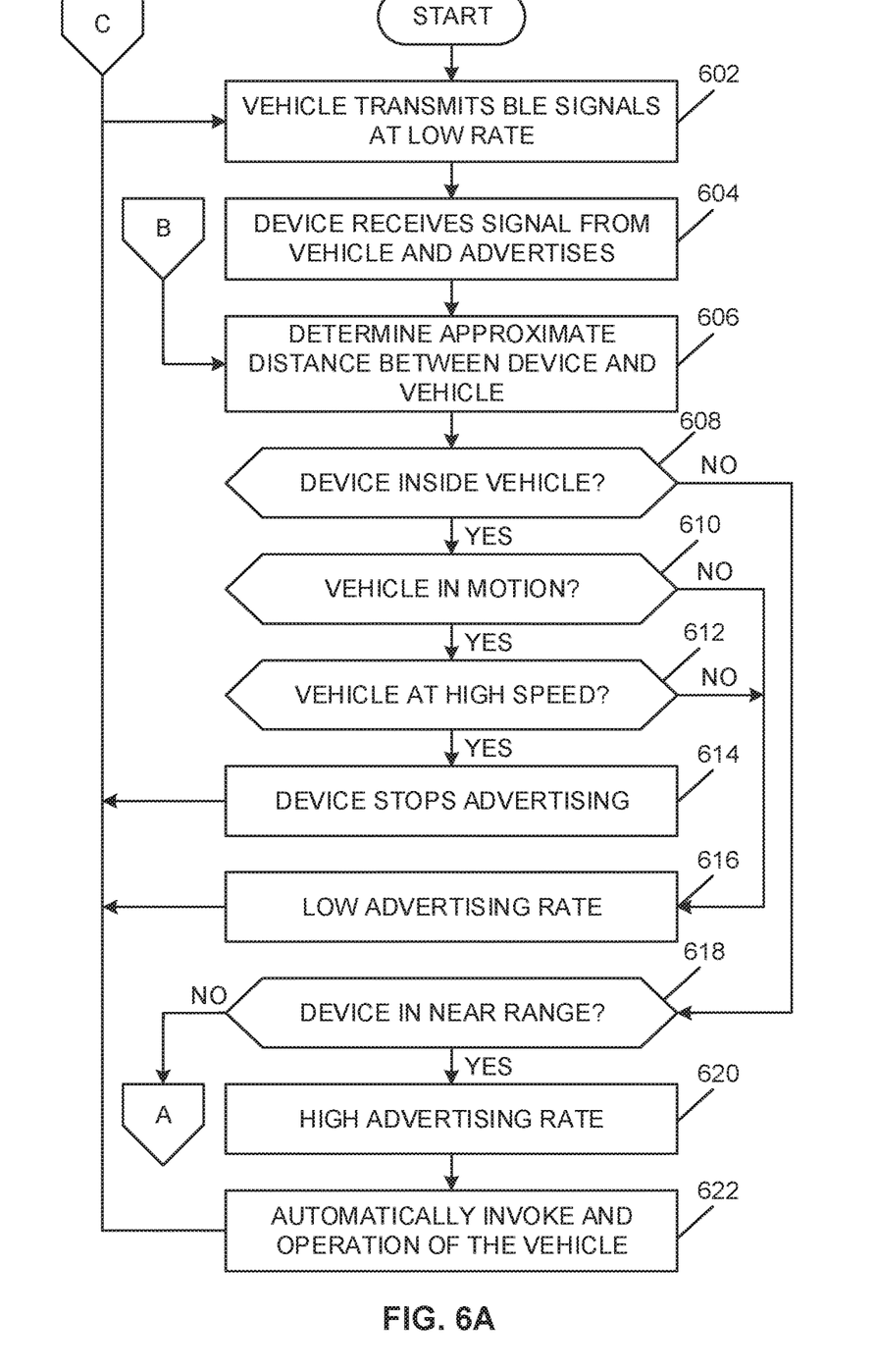
FIGS. 6A-6B represents an example method that may be implemented with the example apparatus described herein.
Figure 6B:
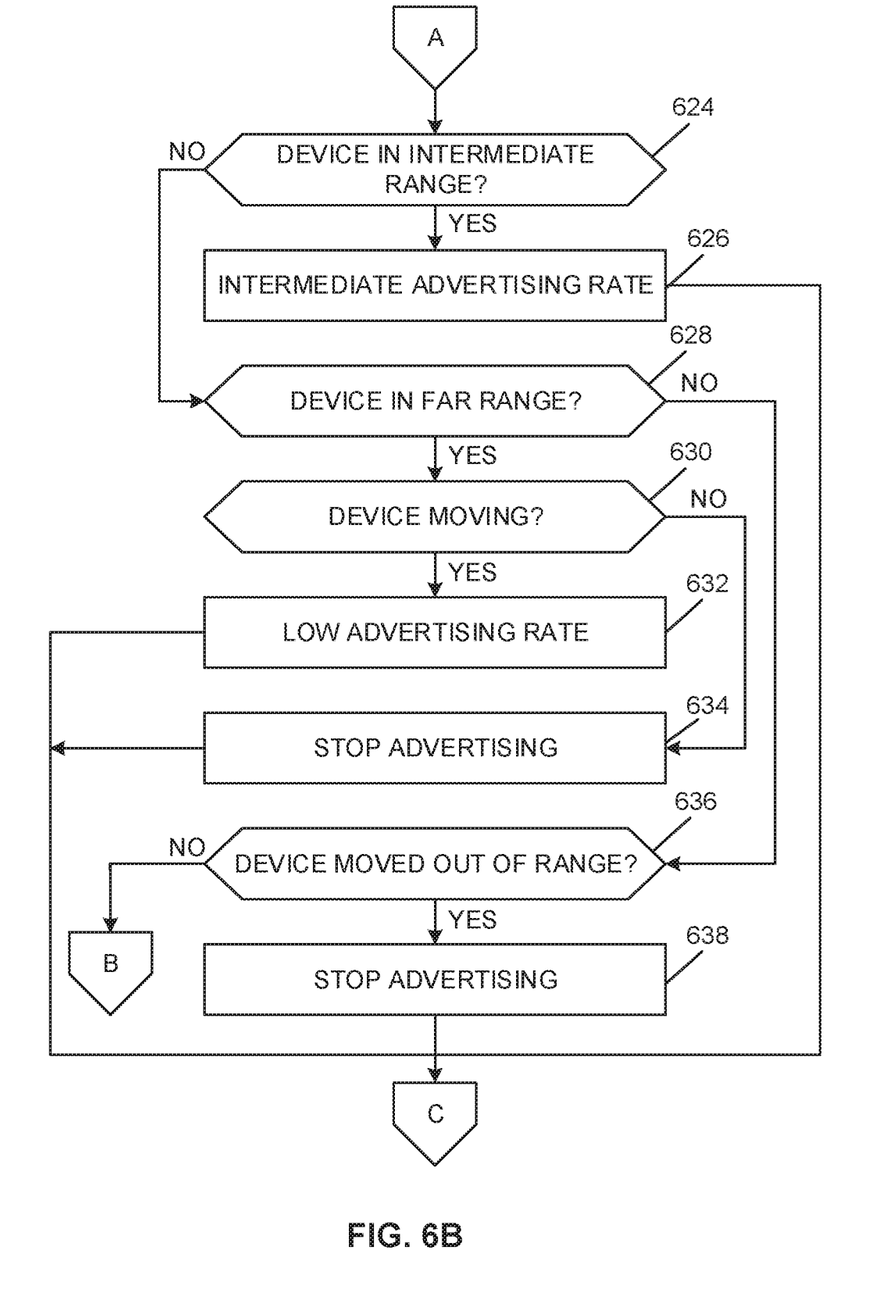

FIGS. 6A-6B represent an example method 600 that may be implemented with the example apparatus 102 and the vehicle 104 described herein. In this example, the method 600 may be implemented using machine readable instructions that comprise a program for execution by a processor such as the processors 510 and 514 shown in the example device 102 and vehicle 104 in FIG. 5. Further, although the example program is described with reference to the flowchart illustrated in FIG. 6, many other methods of implementing the examples described herein may alternatively be used. For example, the order of execution of the blocks may be changed, and/or some of the blocks described may be changed, eliminated, or combined.

As mentioned above, the example method of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media.

The method 600 begins when the vehicle 104 transmits signals, such as Bluetooth® Low Energy signals, at a low rate to determine if any devices 102 are within range of the vehicle 104 (block 602). The device 102 receives and detects a signal from the vehicle 104 and begins transmitting signals (e.g., advertising) to the vehicle 104 (block 604). The vehicle 104 and the device 102 are operative to determine a distance between the device 102 and the vehicle 104 based on a signal strength (block 606). The vehicle 104 and/or the device 102 determine if the distance between the device 102 and the vehicle 104 indicates that the device 102 is in the vehicle 104 (block 608). If the device 102 is in the vehicle 104, the vehicle 104 and/or the device 102 determine whether or not the vehicle 104 is in motion (block 610). If the vehicle 104 is in motion, the vehicle 104 determines a speed at which the vehicle 104 is traveling (block 612). If the vehicle 104 is traveling at a high speed (e.g., a speed above a predetermined threshold speed), the device 102 stops advertising (block 614). If the vehicle 104 is not in motion or the vehicle 104 is in motion traveling at a low speed (e.g., a speed below the predetermined threshold speed), the device 102 advertises at a low rate (block 616).

If the device 102 is not inside the vehicle 104 at block 608, the vehicle 104 and/or the device 102 determine if the distance between the device 102 and the vehicle 104 indicates that the device 102 is within a near range of the vehicle 104 (block 618). If the device 102 is within a near range, the device 102 advertises at a high rate (block 620). An operation of the vehicle 104 may then be automatically invoked to, for example, facilitate use of the vehicle 104 for the person 106 bearing the device 102 (block 622). In one example, the vehicle 104 may determine a door or other opening to which the device 102 and, thus, the person 106 is closest and may then enable access to that opening (e.g., unlock a door, trunk lid, etc.)

If the device 102 is not within a near range at block 618, the vehicle 104 and/or the device 102 may determine whether the device is within an intermediate range of the vehicle 104 (block 624). If the device 102 is within an intermediate range of the vehicle 104, the device 102 advertises at a medium rate (block 626). The intermediate advertising rate being a lower rate than the high rate and a higher rate than the low rate. If the device 102 is not within an intermediate range of the vehicle 104, the vehicle 104 and/or the device 102 determine whether the device 102 is within a far range of the vehicle 104 (block 628). If the device 102 is within a far range, the vehicle 104 may determine whether the device 102 is moving (block 630). If the device 102 is moving, the device 102 advertises at a low rate (block 632). If the device 102 is within the far range but is not moving, the device 102 stops advertising (block 634). If the device 102 is not within the far range, the vehicle 104 may transmit a signal to determine if the device 102 has moved out of the range of communication with the vehicle 104 (block 636). If the device 102 is out of range of the vehicle 104, the device 102 stops advertising (block 638). If the device 102 is within communication range of the vehicle 104, but is no longer in far range, the method 600 returns to block 606 to determine the distance between the device 102 and the vehicle 104.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining a distance of a device from a vehicle based on a signal;
   determining a state of motion of the device; and
   adjusting an advertising rate of the signal based on the distance and state of motion, wherein when the device is in motion at a speed greater than a threshold speed, the advertising rate is adjusted to zero.

2. The method as defined in claim 1 further including determining if the device is in the vehicle based on the distance.

3. The method as defined in claim 2, wherein the speed at which the device is in motion is determined using a global positioning system receiver if the device is outside of the vehicle.

4. The method as defined in claim 1 further including determining the device is outside of the vehicle based on the distance.

5. The method as defined in claim 4, wherein the device is located within a first range of the vehicle and the advertising rate is adjusted to a first rate.

6. The method as defined in claim 5, wherein the device is located within a second range of the vehicle and the advertising rate is adjusted to a second rate lower than the first rate.

7. The method as defined in claim 6, wherein the device is located within a third range of the vehicle and the advertising rate is adjusted to a third rate lower than the second rate.

8. The method as defined in claim 4 further including determining an opening of the vehicle to which the device is closest.

9. The method as defined in claim 8 further including automatically unlocking the opening.

10. The method as defined in claim 4, wherein when the device is not in motion, the advertising rate is adjusted to zero.

11. An apparatus comprising:
    a communication interface to transmit signals to a vehicle;
    an accelerometer to determine a state of motion; and
    a processor to adjust an advertisement rate of the signal based on a distance to the vehicle and the state of motion, the processor to adjust the advertisement rate to zero when the state of motion is a speed greater than a threshold speed.

12. The apparatus as defined in claim 11, wherein the processor is to determine the distance to the vehicle based on the signals.

13. The apparatus as defined in claim 12, wherein when the distance is within a first range, the processor adjusts the advertisement rate to a first rate.

14. The apparatus as defined in claim 13, wherein when the distance is within a second range closer to the vehicle than the first range, the processor adjusts the advertisement rate to a second rate higher than the first rate.

15. The apparatus as defined in claim 14, wherein when the distance is within a third range closer to the vehicle than the second range, the processor adjusts the advertisement rate to a third rate higher than the second rate.

16. An apparatus comprising:
a vehicle, and
a device to communicate with the vehicle, the device to adjust a rate of communication based on a distance of the device relative to the vehicle and a state of motion of the device, the device to adjust the rate to zero when the state of motion is a speed greater than a threshold speed.

17. The apparatus as defined in claim 16, wherein the vehicle transmits first signals and the device transmits second signals to respond to the first signals, a rate of the second signals based on the distance and the state of motion.

18. The apparatus as defined in claim 17, wherein when the device is in close proximity to the vehicle, the second signals are advertised at a first rate.

19. The apparatus as defined in claim 18, wherein when the device is not in close proximity to the vehicle, the second signals are advertised at a second rate lower than the first rate.

* * * * *